US011067392B2

(12) United States Patent
Tan et al.

(10) Patent No.: US 11,067,392 B2
(45) Date of Patent: Jul. 20, 2021

(54) ANCHOR BOLT LENGTH DETERMINATION METHOD BASED ON MONITORING OF ROOF ROCK STRATUM HORIZONTAL EXTRUSION FORCE (71) Applicant: SHANDONG UNIVERSITY OF SCIENCE AND TECHNOLOGY, Qingdao (CN)

(72) Inventors: Yunliang Tan, Qingdao (CN); Kai Zhou, Qingdao (CN); Fenghai Yu, Qingdao (CN); Tongbin Zhao, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/043,778

(22) PCT Filed: May 14, 2019

(86) PCT No.: PCT/CN2019/086734
§ 371 (c)(1),
(2) Date: Sep. 30, 2020

(87) PCT Pub. No.: WO2020/119019
PCT Pub. Date: Jun. 18, 2020

(65) Prior Publication Data
US 2021/0018315 A1    Jan. 21, 2021

(30) Foreign Application Priority Data
Dec. 14, 2018  (CN) .......................... 201811530081.0

(51) Int. Cl.
*G01B 21/02*   (2006.01)
*E21D 21/00*   (2006.01)
(Continued)

(52) U.S. Cl.
CPC ............. *G01B 21/02* (2013.01); *E21D 21/00* (2013.01); *E21F 17/00* (2013.01); *E21B 49/00* (2013.01)

(58) Field of Classification Search
CPC ......... G01B 21/02; E21D 21/00; E21F 17/00; E21B 49/00
See application file for complete search history.

(56) References Cited

FOREIGN PATENT DOCUMENTS

| CN | 203669931 U | 6/2014 |
| CN | 109372581 A | 2/2019 |
| CN | 109630201 A | 4/2019 |

OTHER PUBLICATIONS

Lian et al., Study on Reinforcement Technique of Development Roadway with High Argillaceous Surrounding Rock in Jurassic Strata, 2015 Transit Development in Rock Mechanics, Taylor & Francis Group, London, pp. 709-712 (Year: 2015).*

(Continued)

*Primary Examiner* — Toan M Le
(74) *Attorney, Agent, or Firm* — Hauptman Ham, LLP (57) ABSTRACT An anchor bolt length determination method based on monitoring of a roof rock stratum horizontal extrusion force includes drilling a borehole in the middle of a roadway roof to determine a surrounding rock fracturing scope by a borehole television. The method includes selecting the number and locations of horizontal extrusion force measuring points according to the surrounding rock fracturing scope. The method includes monitoring and recording a change of the horizontal extrusion force over time in the borehole by a device for monitoring a roof rock stratum horizontal extrusion force. The method includes selecting a location with the largest horizontal extrusion force as a center of a anchoring segment of an anchor bolt to determine a distance (Continued)

between the anchoring center and the roof. The method includes calculating a total length of the anchor bolt.

7 Claims, 6 Drawing Sheets

(51) Int. Cl.
    *E21F 17/00*         (2006.01)
    *E21B 49/00*         (2006.01)

(56) References Cited

OTHER PUBLICATIONS

Jiang et al., Interaction Mechanism of Yielding Rock Bolt and Matrix Mass, May 10-13, 2015, 13th International Congress of Rock Mechanics, Montreal, Canada, 10 pp. (Year: 2015).*

International Search Report issued in corresponding International Application No. PCT/CN2019/086734; dated Aug. 2, 2019; 8 pgs.

Written Opinion of the International Searching Authority issued in corresponding International Application No. PCT/CN2019/086734; dated Aug. 2, 2019; 8 pgs.

Chinese Office Action issued in corresponding Chinese Application No. 2018115300810; dated Feb. 3, 2020; 9 pgs.

Chinese Search Report issued in corresponding Chinese Application No. 2018115300810; dated Dec. 14, 2018; 5 pgs.

Notification to Grant Patent Right for Invention issued in corresponding Chinese Patent Application No. 2018115300810; dated May 29, 2020; 4 pgs.

\* cited by examiner

ANCHOR BOLT LENGTH DETERMINATION METHOD BASED ON MONITORING OF ROOF ROCK STRATUM HORIZONTAL EXTRUSION FORCE

RELATED APPLICATIONS

The present application is a U.S. National Phase of International Application Number PCT/CN2019/086734, filed May 14, 2019, and claims the priority of Chinese Application No. 201811530081.0, filed Dec. 14, 2018.

TECHNICAL FIELD

The present disclosure relates to the technical field of mining engineering, and in particular to an anchor bolt length determination method based on monitoring of a roof rock stratum horizontal extrusion force.

BACKGROUND

In a large number of coal roadways excavated annually in China, bolt-supported roadways account for 80% or more of the coal roadways. To ensure safety of bolt supporting, bolt supporting parameters are to be determined reasonably. At present, the bolt supporting parameters in a coal mine are mainly determined by methods such as an empirical method, theoretical calculation and dynamic information design, while anchor bolt lengths are usually determined by the empirical method and the theoretical calculation method. The empirical method directly determines the anchor bolt length by referring to a similar engineering geological condition, and thus has a relatively poor accuracy. The theoretical calculation method is mainly applied to anchor an anchor bolt at an end. The anchor bolt length generally includes three parts of an anchoring segment length, a free segment length and an exposed segment length. The anchoring segment is generally determined to be about 0.5 m according to the number and the length of a cartridge; the exposed segment is generally determined to be 0.2-0.3 m by a structure of a tray and a nut; and the free segment length depends on a scope of a rock stratum effectively supported by the anchor bolt, and may be different for a different supporting theory. Therefore, the method does not have good supporting applicability under the condition of a large roadway scope. When the bolt anchoring segment is located in a fractured surrounding rock, a bonding force and a bonding length have greater impact on an anchoring effect, and unreasonable designing of the anchoring segment length will easily lead to an actual anchoring force less than a design anchoring force, thus affecting the supporting effect of the anchor bolt.

The anchoring segment of the anchor bolt designed at a location with the largest horizontal pressure may increase the bonding force between the anchor bolt and an anchoring agent so as to enhance the anchoring effect. Therefore, it is required to firstly measure a horizontal stress to determine the location of the anchoring segment reasonably and enhance the supporting effect of the anchor bolt. A method of testing a stress of an underground surrounding rock in a coal mine mainly includes a hydraulic fracturing method and a sleeve fracturing method. In the hydraulic fracturing method, a fracturing point is closed using a waterstop packer at a designated location, the stress of the surrounding rock is measured by fracturing a hole wall by performing pressurization using a hydraulic pump. In this method, the test instrument is relatively bulky and not well applicable to the more broken surrounding rocks. In the sleeve fracturing method, a borehole is fractured by pressurizing a rubber sleeve to obtain the stresses of the surrounding rocks sequentially. However, calculation is required after the test is completed. A geostress test instrument used cannot directly reflect the stress of the surrounding rock, leading to a less intuitive result. The stress of the surrounding rock may also be measured by an instrument such as a borehole stress meter. A multi-point stress meter disclosed in Chinese patent CN 203669931 U may realize real-time testing of multi-point stresses. However, it is difficult to push and fix a monitoring device for monitoring a roof stress and thus the requirements of monitoring the roof stress are difficult to satisfy.

To measure the horizontal stress of the roof accurately, determine the stress of the surrounding rock accurately and conveniently, provide basis for designing parameters such as the anchor bolt length, and improve the bolt supporting effect, it is required to further improve an existing anchor bolt length determination method.

SUMMARY

To determine an anchoring segment location of an anchor bolt and an anchor bolt length reasonably, the present disclosure provides an anchor bolt length determination method based on monitoring of a roof rock stratum horizontal extrusion force. A specific technical solution is described below.

An anchor bolt length determination method based on monitoring of a roof rock stratum horizontal extrusion force includes the following steps.

At step (1), a borehole is drilled in the middle of a roadway roof to determine a surrounding rock fracturing scope using a borehole television.

At step (2), the number and locations of horizontal extrusion force measuring points are selected according to the surrounding rock fracturing scope.

At step (3), a change of the horizontal extrusion force of each horizontal extrusion force measuring point over time in the borehole is monitored and recorded.

At step (4), a location with the largest horizontal extrusion force is selected as a center of an anchoring segment of the anchor bolt to determine a distance between the anchoring center and the roof.

At step (5), a total length of the anchor bolt is calculated.

Preferably, at step (1), the borehole is 2-5 m in depth and 70-100 mm in diameter; at step (2), the horizontal extrusion force measuring points are set at a portion 1 m or more from the roof and mutually spaced less than 0.5 m.

Preferably, at step (3), the change of the horizontal extrusion force of each horizontal extrusion force measuring point over time in the borehole is monitored and recorded by a device for monitoring a roof rock stratum horizontal extrusion force. The device for monitoring a roof rock stratum horizontal extrusion force includes a pressure measuring segment, a connecting rod, a hydraulic pump, a pressure gauge, a high-pressure oil pipe, a pressure control valve, a tray, a push rod and a connection casing; the connecting rod is connected with the pressure measuring segment, a front end of the push rod is connected with the connecting rod, a rear end of the push rod passes through the tray, and the connection casing is connected with the tray; the high-pressure oil pipe is connected with the hydraulic pump and protrudes to the pressure measuring segment through inner cavities of the push rod and a connection casing; the pressure measuring segment includes a main pipe, a hydraulic bladder, a fixing ring, a barrier sheet, an outer pillow housing and a connection sleeve; both ends of the hydraulic bladder are sleeved on the main pipe by the fixing rings, and an oil inlet is disposed on the main pipe to communicate with the hydraulic bladder; the outer pillow housing is sleeved on the main pipe, the connection sleeve is wrapped around an outer side of the outer pillow housing, and the barrier sheet is disposed between the fixing ring and the outer pillow housing.

Preferably, each high-pressure oil pipe is divided into a plurality of segments and the high pressure oil pipes are connected by oil pipe joints, where one segment is connected on the hydraulic pump, one segment is disposed in the inner cavities of the push rod and the connecting rod, and another segment is disposed in the pressure measuring segment; the oil pipe joint is disposed in the connection casing; the pressure control valve and the pressure gauge are further disposed on the high-pressure oil pipe connected on the hydraulic pump; two or more pressure measuring segments are connected with the connecting rod, and one communicating high-pressure oil pipe is disposed for each pressure measuring segment; a design length margin of the high-pressure oil pipe is placed in the connection casing.

Preferably, the high-pressure oil pipe and the oil inlet on the main pipe are connected by an oil pipe joint, internal threads are disposed at inner sides of pipe walls at both ends of the main pipe respectively to be mated with an external thread of the connecting rod, and external threads are disposed at outer sides of pipe walls at both ends of the main pipe respectively to be mated with internal threads of the barrier sheets; a through-hole is disposed in the tray, and the connecting rod passes through the through-hole of the tray; the connection casing is connected with an external thread at a convex portion of the tray; the push rod pushes the connecting rod and the pressure measuring segment by the connection casing.

Preferably, the outer pillow housing is divided into four parts of same shape, and a combination body of the outer pillow housing is a cylindrical housing; the outer pillow housing is sleeved on the main pipe in a combination manner when the hydraulic bladder contracts, and expands in four parts when the hydraulic bladder is liquid-filled to expand; both ends of the connection sleeve are closely attached to the main pipe, and the connection sleeve tightly presses both ends of the outer pillow housing to be in contact with the main pipe.

Further, preferably, monitoring and recording the change of the horizontal extrusion force over time in the borehole by the device for monitoring a roof rock stratum horizontal extrusion force includes the following steps.

At step a, the connecting rod is connected with the pressure measuring segment, the high-pressure oil pipes in the inner cavities of the connecting rod and the pressure measuring segment are connected by oil pipe joints, the tray is fixed, and the connection casing is mounted.

At step b, the connecting rod and the pressure measuring segment are pushed into the borehole by the push rod, and the connection casing and the push rod are dismounted after the tray and the roof are fixed.

At step c, the exposed high-pressure oil pipes are connected, and the hydraulic pump, the pressure control valve and the pressure gauge are connected.

At step d, a switch on the pressure control valve is turned on to perform pressurization by injecting oil with the hydraulic pump, and after the reading of the pressure gauge reaches 5-6 MPa, the pressurization is stopped and the hydraulic oil flows back; the air in the high-pressure oil pipe is emptied by repeating this step 2-5 times.

At step e, pressurization is performed by injecting oil using the hydraulic pump, and the pressure control valve is closed after the reading of the pressure gauge reaches 5-6 MPa.

At step f, pressurization is performed for a plurality of pressure measuring segments respectively by injecting hydraulic oil according to the steps d and e.

At step g, the hydraulic pump is dismounted, and monitoring data of the pressure gauge is monitored and stored.

At step h, the pressure control valve is opened to discharge the hydraulic oil; the connection casing and the push rod are connected to take out the connecting rod and the pressure measuring segment from the borehole.

Preferably, at step (5), calculation of the anchor bolt length includes calculation of an anchoring segment length $L_{a1}$ of the anchor bolt, a free segment length $L_{a2}$ of the anchor bolt and a total length $L_a$ of the anchor bolt, where the free segment length of the anchor bolt is $$L_{a2} = h - \frac{1}{2}L_{a1},$$

the distance between the anchoring center and the roof is h, and the anchoring segment length $L_{a1}$ of the anchor bolt is 0.3-0.5 m; the total length of the anchor bolt is $L_a = L_{a1} + L_{a2} + L_{a3}$, and an exposed segment length $L_{a3}$ of the anchor bolt is $L_{a3}$, where $L_{a3}$ is 0.2-0.3 m.

The present disclosure has the following beneficial effects.

(1) An anchor bolt length determination method based on monitoring of a roof rock stratum horizontal extrusion force according to the present disclosure fully utilizes the monitoring result of the horizontal extrusion force to reasonably determines the length of the anchoring segment length of the anchor bolt and further obtain bolt supporting length parameters, thereby greatly improving the bonding force and the bonding length of the anchoring segment of the anchor bolt, promoting a anchoring performance of the anchor bolt, and enhancing a roadway supporting effect.

(2) The device for monitoring a roof rock stratum horizontal extrusion force according to the present disclosure may perform horizontal stress monitoring for the points in the borehole by using the hydraulic pump and the pressure measuring segment so as to monitor the horizontal stresses of several borehole depths by using one borehole without mutual interference among monitorings of different pressure measuring segments; the high-pressure oil pipes are disposed in the inner cavities of the push rod and the connection casing to protect the safety of the high-pressure oil pipes; further, the monitoring device is convenient to dismount and can be utilized repeatedly.

(3) The pressure measuring segment of the device for monitoring a roof rock stratum horizontal extrusion force adopts a combination-type outer pillow housing to better contact with the surrounding rock in the borehole, to obtain a more accurate pressure measurement. With use of the combination of the push rod and the connecting rod, the device is more conveniently used in different depths of boreholes and the monitoring scope can be expanded with the combination of the push rod and the connecting rod with different lengths; the barrier sheet is disposed between the fixing ring and the outer pillow housing, and the barrier sheets at both sides can prevent expansion of the hydraulic bladder along a direction of the main pipe effectively, thereby ensuring a monitoring accuracy.

In addition, the present disclosure has advantages of less construction work, simpler method, simpler and faster calculation, stronger applicability, and the like.

Numerals of the drawings are described as follows: 1—pressure measuring segment; 11—main pipe; 111—oil inlet; 112—external thread; 113—internal thread; 12—hydraulic bladder; 13—fixing ring; 14—barrier sheet; 15—outer pillow housing; 16—connection sleeve; 2—connecting rod; 3—hydraulic pump; 4—pressure gauge; 5—high-pressure oil pipe; 6—pressure control valve; 7—tray; 8—push rod; and 9—connection casing.

DETAILED DESCRIPTIONS OF EMBODIMENTS

As shown in FIGS. 1-13, an anchor bolt length determination method based on monitoring of a roof rock stratum horizontal extrusion force according to the present disclosure is specifically performed in the following examples.

Example 1

Figure 1:
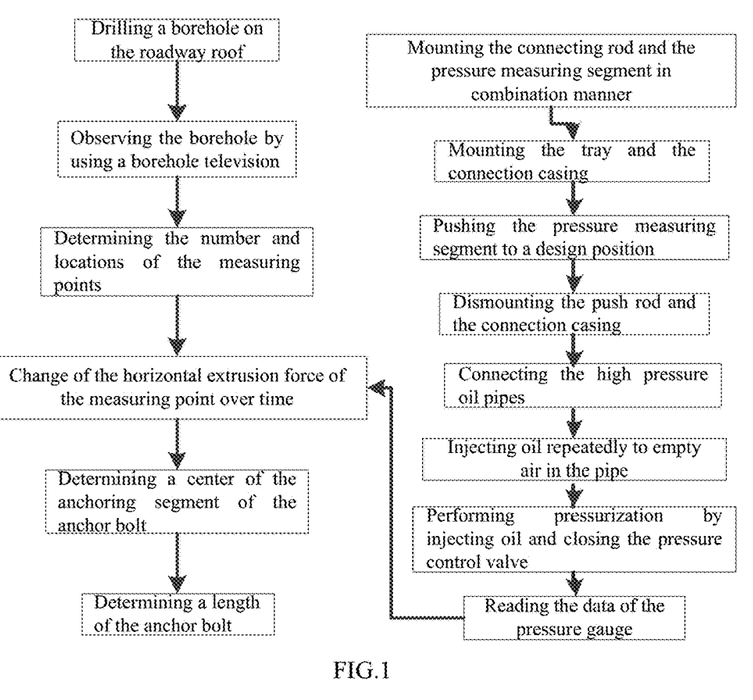
FIG. 1 is a schematic diagram illustrating steps of an anchor bolt length determination method according to an example of the present disclosure.

A flowchart of an anchor bolt length determination method based on monitoring of a roof rock stratum horizontal extrusion force according to the present disclosure is as shown in FIG. 1. The method includes the following specific steps.

At step (1), a borehole is drilled in the middle of a roadway roof to determine a surrounding rock fracturing scope by a borehole television. During construction, a borehole with a borehole depth being 2-5 m and a borehole diameter being 70-100 mm is drilled perpendicular to the roof, where the depth and the diameter of the borehole are determined according to an actual situation of the roof in a coal mine. The borehole is observed by the borehole television to obtain a scope of fracture distribution and loosening damage of the surrounding rock in the borehole, so as to determine a key region scope for monitoring of the horizontal extrusion force.

At step (2), the number and locations of horizontal extrusion force measuring points are selected according to the surrounding rock fracturing scope. Measuring points are mainly set in a severely-fractured region, an arrangement distance of the measuring points may be shortened appropriately in the severely-fractured region according to the fracturing situation of the surrounding rock. The horizontal extrusion force measuring points are generally set at a portion 1 m or more from the roof and mutually spaced less than 0.5 m.

At step (3), a change of the horizontal extrusion force of each horizontal extrusion force measuring point over time in the borehole is monitored and recorded to obtain a curve of the change of the horizontal extrusion force at different depths of the borehole over time.

Figure 2:
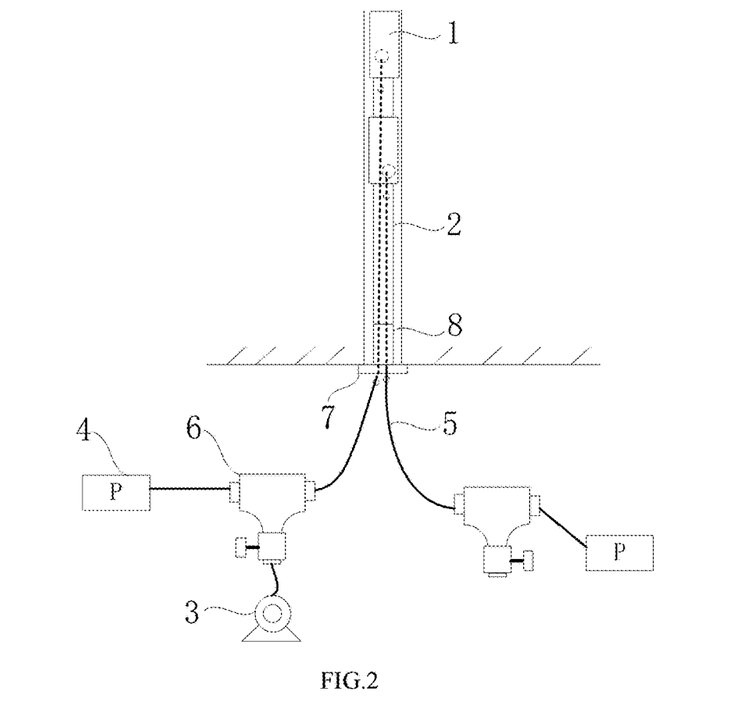
FIG. 2 is a structural schematic diagram illustrating a device for monitoring a roof rock stratum horizontal extrusion force according to an example of the present disclosure.

Specifically, the change of the horizontal extrusion force over time is monitored by the device for monitoring a roof rock stratum horizontal extrusion force, which includes a pressure measuring segment 1, a connecting rod 2, a hydraulic pump 3, a pressure gauge 4, a high-pressure oil pipe 5, a pressure control valve 6, a tray 7, a push rod 8 and a connection casing 9. The connecting rod 2 is connected with the pressure measuring segment 1, a front end of the push rod 8 is connected with the connecting rod 2, a rear end of the push rod 8 passes through the tray 7, and the connection casing 9 is connected with the tray 7. The high-pressure oil pipe 5 is connected with the hydraulic pump 3 and protrudes to the pressure measuring segment through inner cavities of the push rod 8 and the connection rod 2. The pressure measuring segment includes a main pipe, a hydraulic bladder, a fixing ring, a barrier sheet, an outer pillow housing and a connection sleeve. Both ends of the hydraulic bladder are sleeved on the main pipe by the fixing rings, and an oil inlet is disposed on the main pipe to be in communication with the hydraulic bladder. The outer pillow housing is sleeved on the main pipe, the connection sleeve is wrapped around an outer side of the outer pillow housing, and the barrier sheet is disposed between the fixing ring and the outer pillow housing.

Monitoring the change of the horizontal extrusion force over time by the device for monitoring a roof rock stratum horizontal extrusion force includes the following steps.

At step a, the connecting rod 2 with an appropriate length is selected according to the location of the horizontal extrusion force measuring point and the depth of the borehole, the connecting rod 2 is connected with the pressure measuring segment 1, the high-pressure oil pipes 2 in the inner cavities of the connecting rod 2 and the pressure measuring segment 1 are connected by an oil pipe joint, the tray 7 is fixed, and the connection casing 9 is mounted.

At step b, the connecting rod 2 and the pressure measuring segment 1 are pushed into the borehole by the push rod 8.

After the tray 7 and the roof are fixed, the pressure measuring segment 1 mounted, and then the connection casing 9 and the push rod 8 are dismounted by loosening the threads.

At step c, the exposed high-pressure oil pipes 5 are easily connected by an oil pipe joint, and the hydraulic pump 3, the pressure control valve 6 and the pressure gauge 4 are connected, where the pressure gauge 4 and the pressure control valve 6 are firstly connected, and the hydraulic pump 3 and the pressure control valve 6 are then connected.

At step d, a switch on the pressure control valve 6 is turned on to perform pressurization by injecting oil using the hydraulic pump 3, and after the reading of the pressure gauge 4 reaches 5-6 MPa, the pressurization is stopped and the hydraulic oil flows back; the air in the high-pressure oil pipe 5 is emptied as possible by repeating this step 2-5 times.

At step e, the pressurization is performed by injecting oil using the hydraulic pump 3, and after the reading of the pressure gauge 4 reaches 5-6 MPa, the pressure control valve 6 is closed and then the hydraulic pump 3 is dismounted.

At step f, hydraulic oil is injected for a plurality of pressure measuring segments 1 respectively by repeating steps d and e, or hydraulic oil is injected for a plurality of pressure measuring segments 1 simultaneously by using a plurality of hydraulic pumps 3.

At step g, after the hydraulic oil is injected into all pressure measuring segments 1, the hydraulic pump 3 is dismounted, and monitoring data of the pressure gauge is monitored and stored. A digital pressure gauge with a data recording function is used to read the monitoring data at a regular interval of time to facilitate monitoring.

At step h, the pressure control valve 6 is opened to discharge the hydraulic oil, and the pressure measuring segment 1 contracts; the connection casing 9 and the push rod 8 are re-connected to take out the connecting rod 2 and the pressure measuring segment 1 from the borehole to facilitate reuse.

At step (4), a location with the largest horizontal extrusion force is selected as a center of an anchoring segment of the anchor bolt to determine a distance between the anchoring center and the roof where the distance is denoted as h.

At step (5), a total length of the anchor bolt is calculated. Calculation of the anchor bolt length includes calculation of an anchoring segment length $L_{a1}$ of the anchor bolt, a free segment length $L_{a2}$ of the anchor bolt and a total length $L_a$ of the anchor bolt, where the free segment length of the anchor bolt is $$L_{a2} = h - \frac{1}{2}L_{a1},$$

the distance between the anchoring center and the roof is h, and the anchoring segment length $L_{a1}$ of the anchor bolt is 0.3-0.5 m; the total length of the anchor bolt is $L_a = L_{a1} + L_{a2}L_{a3}$, and an exposed segment length of the anchor bolt is $L_{a3}$, which is in the range of 0.2-0.3 m.

Specifically, the structure of the device for monitoring a roof rock stratum horizontal extrusion force used at step (3) includes a pressure measuring segment 1, a connecting rod 2, a hydraulic pump 3, a pressure gauge 4, a high-pressure oil pipe 5, a pressure control valve 6, a tray 7, a push rod 8 and a connection casing 9, as shown in FIG. 2. The connecting rod 2 is thread-connected with the pressure measuring segment 1, a front end of the push rod 8 is connected with the connecting rod 2, the tray 7 is disposed at a rear end of the push rod 8, the connection casing 9 is connected with the tray 7, the high-pressure oil pipe 5 is connected with the hydraulic pump 3 and protrudes to the pressure measuring segment 1 through inner cavities of the push rod 8 and the connection casing 9. The combination of the connecting rod 2 and the pressure measuring segment 1 facilitates monitoring horizontal stresses at different depths, the push rod 8 guarantees that the device can perform deep-hole monitoring, the tray 7 and the connection casing 9 facilitate fixing the device and placing the high-pressure oil pipe 5 in the borehole, the combination of the hydraulic pump 3 and the pressure gauge 4 facilitates real-time monitoring, and the hydraulic pump 3, the pressure gauge 4 and the pressure control valve 6 may realize long-time monitoring for a horizontal stress. The device may include a plurality of pressure measuring segments to monitor the horizontal stress at different depths of a borehole without mutual interference among the monitorings of different pressure measuring segments.

Specifically, the pressure measuring segment includes a main pipe 11, a hydraulic bladder 12, a fixing ring 13, a barrier sheet 14, an outer pillow housing 15 and a connection sleeve 16. As shown in FIGS. 4-10, both ends of the hydraulic bladder 12 are sleeved on the main pipe 11 by the fixing rings 13, an oil inlet 111 is disposed on the main pipe 11 to be in communication with the hydraulic bladder 12, and a sealing gasket may be further disposed between the fixing ring 13 and the main pipe 11 to ensure sealing of the hydraulic bladder 12. The outer pillow housing 15 is sleeved on the main pipe 11, the connection sleeve 16 is wrapped around an outer side of the outer pillow housing 15, and the barrier sheet 14 is disposed between the fixing ring 13 and the outer pillow housing 15. Under the actions of the outer pillow housing 15 and the barrier sheet 14, the hydraulic bladder 12 can only expand along a radial direction of the main pipe, and the connection sleeve 16 ensures that the outer pillow housing 15 can reset smoothly after use.

Each high-pressure oil pipe 5 is divided into a plurality of segments and the high-pressure oil pipes 5 are connected by an oil pipe joint. One segment is connected on the hydraulic pump 3, one segment is disposed in the inner cavities of the push rod 8 and the connecting rod 2, and another segment is disposed in the pressure measuring segment. The pressure control valve 6 and the pressure gauge 4 are further disposed on the high-pressure oil pipe 5 connected on the hydraulic pump 3. The oil pipe joint is disposed in the connection casing 9 to facilitate connection of the high-pressure oil pipes, the pressure control valve and the pressure gauge disposed on the high-pressure oil pipe 5 are used to monitor a hydraulic pressure in the pipe, and an oil inlet valve on the pressure control valve 6 is closed after the hydraulic oil is pumped by the hydraulic pump. Balancing of the pressure in the hydraulic bladder and the pressure in the pipe is realized by using the high-pressure oil pipe 5 and the pressure control valve 6, so that the pressure gauge on the high-pressure oil pipe 5 can measure the horizontal stress of the borehole at the pressure measuring segment accurately. The pressure gauge 4 may be a digital pressure gauge with a recording function for recording pressure monitoring data in real time, and the hydraulic pump 3 may be a high-pressure pump to measure the horizontal stress in a larger scope. The high pressure oil pipe 5 is connected with the oil inlet on the main pipe 11 by an oil pipe joint, internal threads are disposed at inner sides of the pipe walls at both ends of the main pipe 11 respectively to be mated with an external thread of the connecting rod 2, and an external threads are disposed at outer sides of the pipe walls at both ends of the main pipe 11 respectively to be mated with an internal thread of the barrier sheet 14.

Figure 3:
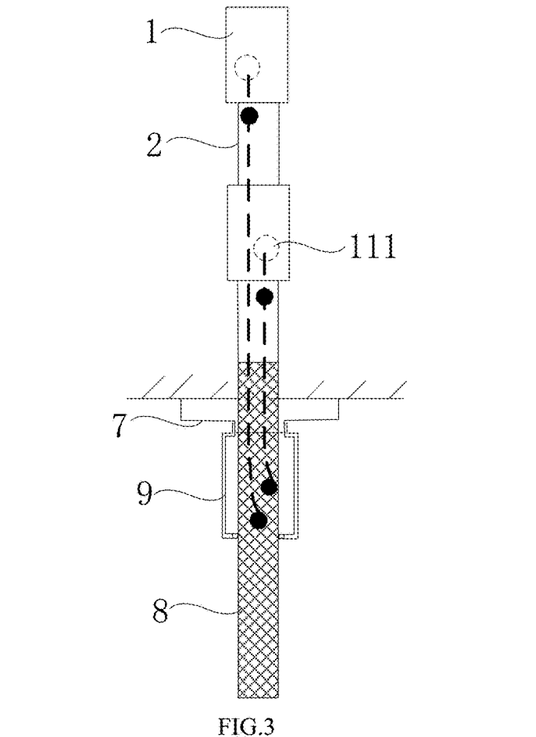
FIG. 3 is a schematic diagram illustrating mounting structures inside and outside a borehole according to an example of the present disclosure.
Figure 4:
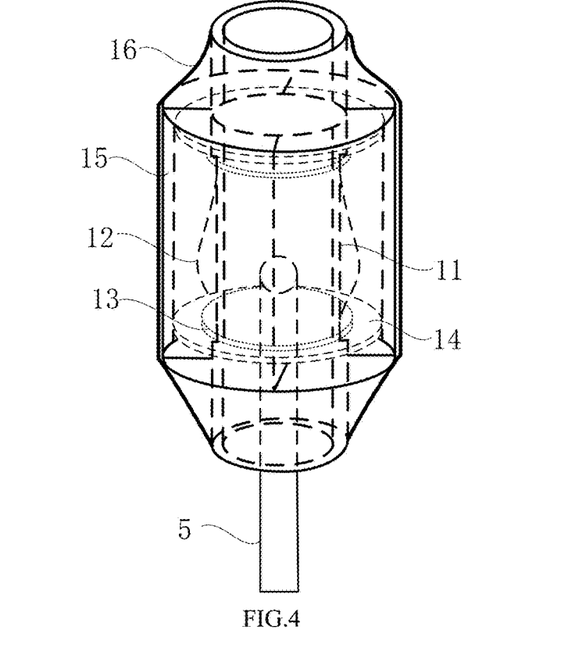
FIG. 4 is a structural schematic diagram illustrating a pressure measuring segment according to an example of the present disclosure.
Figure 5:
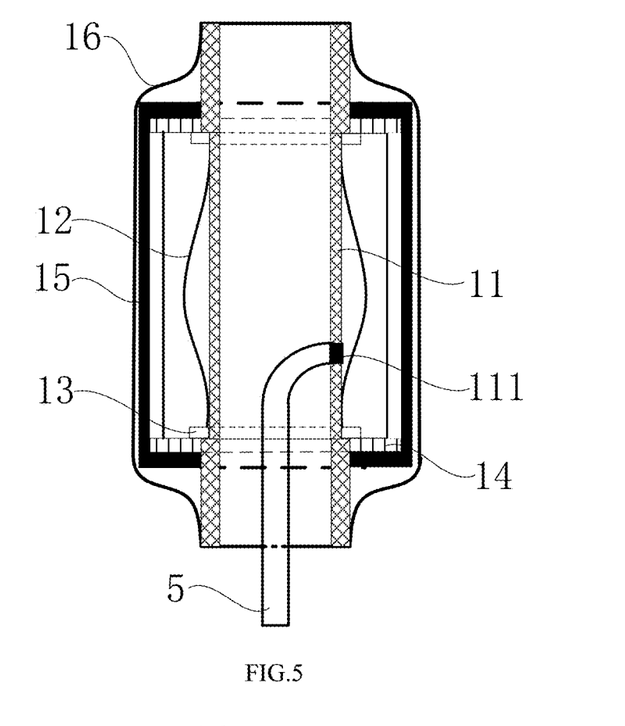
FIG. 5 is a structural schematic diagram illustrating a section of a pressure measurement segment according to an example of the present disclosure.
Figure 6:
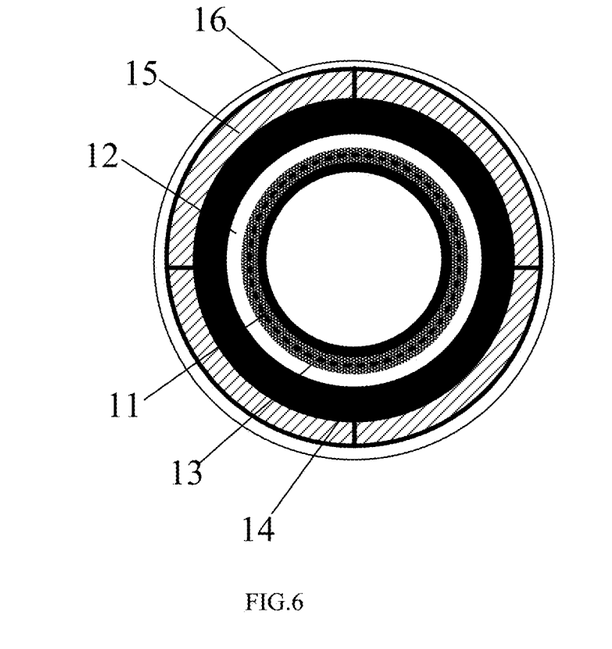
FIG. 6 is a structural schematic diagram illustrating a cross section of a pressure measurement segment according to an example of the present disclosure.
Figure 7:
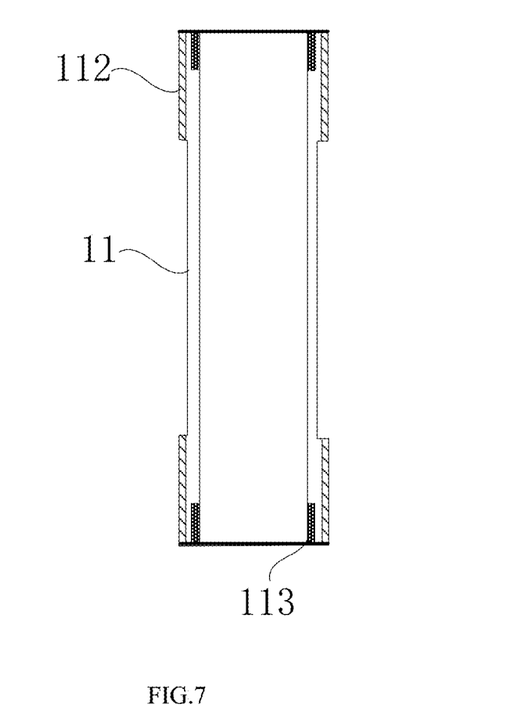
FIG. 7 is a structural schematic diagram illustrating a section of a main pipe according to an example of the present disclosure.
Figure 8:
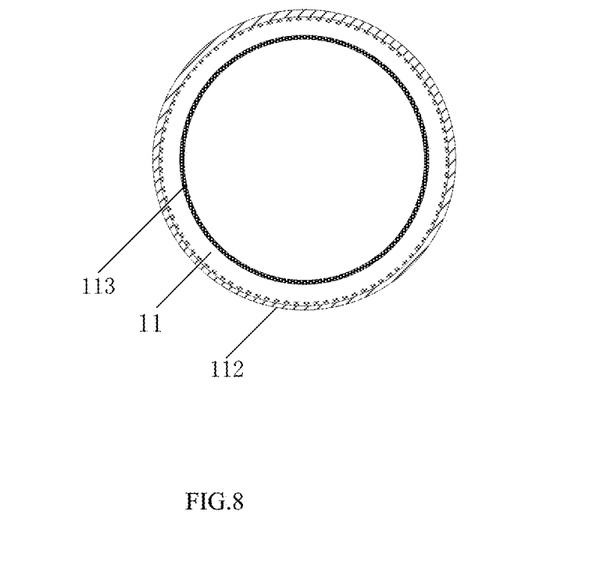
FIG. 8 is a structural schematic diagram illustrating a cross section of a main pipe according to an example of the present disclosure.

As shown in FIG. 3, the connecting rod 2 is connected with two or more pressure measuring segments 1, the number of pressure measuring segments 1 is selected according to the number and the locations of points to be monitored, and the connecting rod 2 with an appropriate length is selected according to the location of the point to be monitored to measure the horizontal stress of the point to be monitored. One communicating high-pressure oil pipe 5 is disposed for each pressure measuring segment, and the high-pressure oil pipe 5 is connected with the oil inlet on the main pipe 11 to ensure that different pressure measuring segments can perform measurement independently. A design length margin of the high-pressure oil pipe 5 is placed in the connection casing 9 to ensure monitoring can be performed at a larger depth of borehole.

Figure 9:
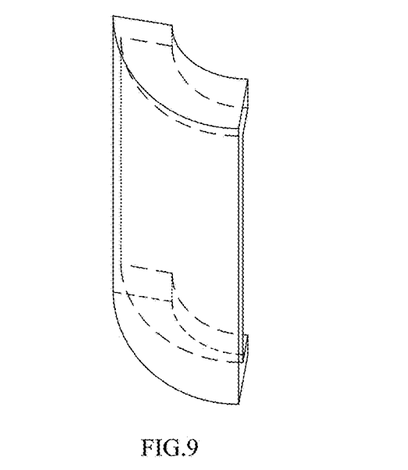
FIG. 9 is a schematic diagram illustrating a partial structure of an outer pillow housing according to an example of the present disclosure.
Figure 10:
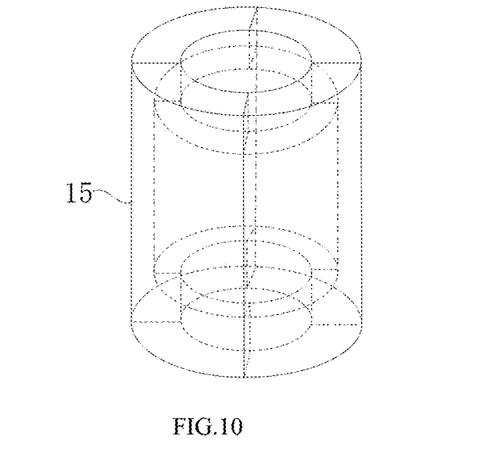
FIG. 10 is a schematic diagram illustrating an overall structure of an outer pillow housing according to an example of the present disclosure.

The outer pillow housing 15 is divided into four or more parts of same shape, and the combination body of the outer pillow housing 15 is a cylindrical housing. As shown in FIG. 9 and FIG. 10, the outer pillow housing 15 is sleeved on the main pipe 11 in a combination manner when the hydraulic bladder 12 contracts and expands in four or more parts when the hydraulic bladder 12 is liquid-filled to expand. After expansion, the outer pillow housing 15 expands outwardly to closely contact with an inner wall of the borehole under the action of the connection sleeve so as to finally keep balance with the horizontal stress in the borehole. At this time, the hydraulic pressure in the hydraulic bladder 12 is equal to the horizontal extrusion force, thereby achieving the measurement purpose. The outer pillow housing 15 and the connection sleeve 16 may also be fixed together through point bonding or fixed connection. Both ends of the connection sleeve 16 are closely attached to the main pipe. When the hydraulic bladder 12 contracts, the connection sleeve 16 tightly presses both ends of the outer pillow housing 15 to be in contact with the main pipe so as to protect the hydraulic bladder 12.

Figure 11:
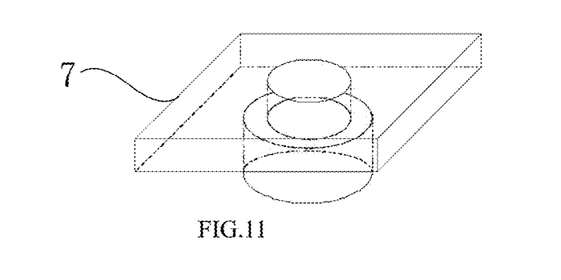
FIG. 11 is a structural schematic diagram illustrating a tray according to an example of the present disclosure.
Figure 12:
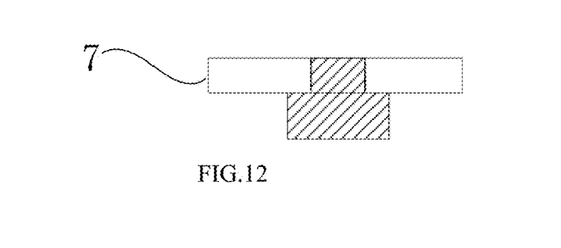
FIG. 12 is a structural schematic diagram illustrating a cross section of a tray according to an example of the present disclosure.

As shown in FIG. 11 and FIG. 12, a through-hole is disposed in the tray 7, a protrusion is further disposed at a lower part of the tray 7, the connecting rod 2 and the push rod 8 can both pass through the through-hole of the tray, the push rod 8 is designed as hollow to facilitate protecting the high-pressure oil pipe, a length of the push rod 8 may be designed arbitrarily according to requirements of the borehole depth, and an external thread may be further disposed on the push rod to facilitate push. During mounting, the tray 7 is fixed at an opening of the borehole of the roof. The tray 7 serves to bear the structure inside the borehole after the combination of the pressure measuring segment 1 and the connecting rod 2 protrudes into the borehole. The connection casing 9 is connected with the external thread at a convex position of the tray 7, and the push rod 8 pushes the connecting rod 2 and the pressure measuring segment 1 by the connection casing 9. The main pipe 11 and the push rod 8 may be made of a steel material to ensure a push strength, and the hydraulic bladder 12 and the connection sleeve 16 may be made of a flexible rubber material to ensure the elasticity and durability of of the structure during expansion and contraction.

Example 2

To further describe the anchor bolt length determination method based on monitoring of a roof rock stratum horizontal extrusion force according to the present disclosure, descriptions are further made in detail below with a particular mine in this example. The main mining coal 3-1 of the mine has a coal seam with a thickness being 3.6 m. The roof rock stratum sequentially includes sandy mudstone of 2.5-3.6 m, fine sandstone of 4.5-7.3 m and siltstone of 11.2-18.9 m from bottom to top. A haulage drift is excavated along a bottom to form a roadway with a rectangular section, which is 5.2 m width×3.6 m height.

Specifically, the determination of the anchor bolt length includes the following steps.

At step (1), a borehole with a depth L being 3 m and a diameter D being 79 m is drilled perpendicular to a roadway roof in the middle of the roadway roof where the anchor bolt length is to be determined. The borehole is detected by a borehole television to obtain a scope of fracture distribution and loosening damage of a surrounding rock in the borehole: obvious fracture occurs at the borehole depth of 1.2 m to 2.8 m and the fracture is severe at the depth of 1.4 m to 1.9 m.

At step (2), the number and locations of horizontal extrusion force measuring points are selected according to the surrounding rock fracture scope. It is required to mount the pressure measuring segment within the range of 1.2 m to 2.8 m of the borehole depth. Particularly, the measuring points to be monitored have to be spaced as small as possible at the depth of 1.4 m to 1.9 m, the number of pressure measuring segments to be mounted is determined as five, and depths of the measured horizontal extrusion forces are 1.4 m, 1.7 m, 1.9 m, 2.3 m and 2.8 m respectively.

At step (3), a curve of change of the horizontal extrusion force over time is obtained by monitoring the horizontal extrusion force in the borehole using a device for monitoring a roof rock stratum horizontal extrusion force, which includes the following steps.

At step a, the connecting rod with an appropriate length is selected according to the location of the horizontal extrusion force measuring point and the depth of the borehole, five pressure measuring segments 1 are connected by the connecting rod 2, the high-pressure oil pipes 5 in the inner cavities of the connecting rod 2 and the pressure measuring segments 1 are connected by an oil pipe joint, the tray 7 is fixed, and the connection casing 9 is mounted.

At step b, the connecting rod 2 and the pressure measuring segment 1 are pushed into the borehole by the push rod 8, and after the tray 7 and the roof are fixed, the pressure measuring segment 1 is mounted and then the connection casing 9 and the push rod 8 are dismounted by loosening the threads.

At step c, the exposed high-pressure oil pipes 5 are easily connected by the oil pipe joint, and the hydraulic pump 3, and the pressure control valve 6 and the pressure gauge 4 are connected, where the pressure gauge 4 and the pressure control valve 6 are firstly connected, and the hydraulic pump 3 and the pressure control valve 6 are then connected.

At step d, the switch on the pressure control valve 6 is turned on to perform pressurization by injecting oil using the hydraulic pump 3, and after the reading of the pressure gauge 4 reaches 5-6 MPa, the pressurization is stopped and the hydraulic oil flows back; the air in the high-pressure oil pipe 5 is emptied as possible by repeating this step 3 times.

At step e, pressurization is performed by injecting oil using the hydraulic pump 3, and after the reading of the pressure gauge 4 reaches 5-6 MPa, the pressure control valve 6 is closed and the hydraulic pump 3 is dismounted.

At step f, pressurization is performed for five pressure measuring segments 1 respectively by injecting hydraulic oil according to steps d and e, or pressurization is performed for five pressure measuring segments simultaneously by injecting hydraulic oil using a plurality of hydraulic pumps 3.

At step g, after the hydraulic oil is injected into all pressure measuring segments 1, the hydraulic pump 3 is dismounted, monitoring data of the pressure gauge is monitored and stored, where a digital pressure gauge with a data recording function is used to record and store the readings within 72 hours and read the monitoring data every 72 hours.

At step h, the pressure control valve 6 is opened to discharge the hydraulic oil, and the pressure measuring segment 1 contracts; the connection casing 9 and the push rod 8 are re-connected to take out the connecting rod 2 and the pressure measuring segment 1 from the borehole so as to facilitate reuse.

At step (4), a location with the largest horizontal extrusion force is selected as a center of the anchoring segment of the anchor bolt to determine a distance between the anchoring center and the roof.

Figure 13:
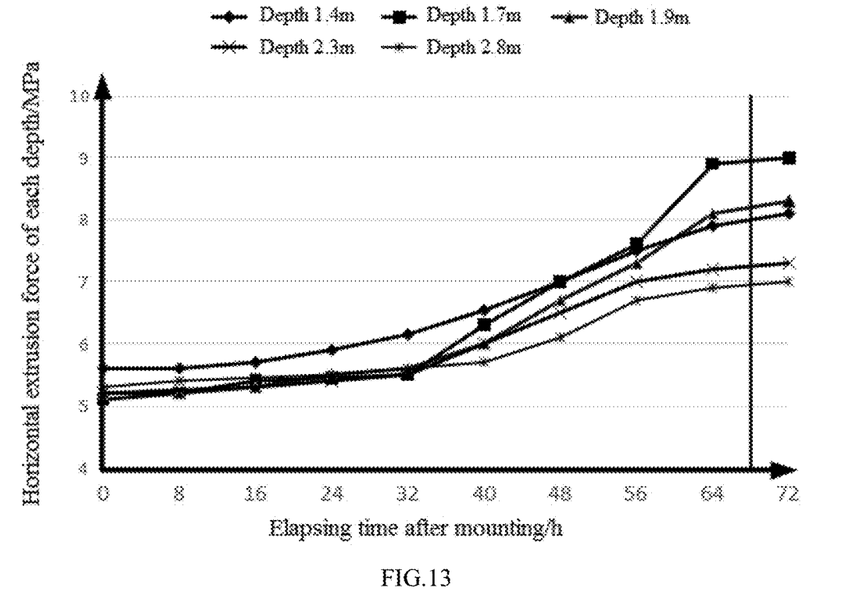
FIG. 13 illustrates a curve of change of a horizontal extrusion force over time.

The data collected at step (3) is prepared and analyzed to obtain the change of the horizontal extrusion force over time as shown in FIG. 13. The horizontal extrusion forces at different depths of the borehole of the surrounding rock all become the largest at the 68th hour, and later, the horizontal extrusion forces tend to be stable. When the depth of the borehole is 1.7 m, the horizontal extrusion force of a fracturing zone of the roof is the largest, and the value of the horizontal extrusion force is 9 MPa at this time. Therefore, the distance between the anchoring center and the roof is determined as 1.7 m.

At step (5), a total length of the anchor bolt is calculated.

The length of the anchoring segment of the anchor bolt is determined according to the number and lengths of cartridges. Two cartridges with each being 0.2 m long are selected. Therefore, $L_{a1}=0.4$ m. At this time, the free segment length is $$L_{a2} = h - \frac{1}{2}L_{a1} = 1.7 - \frac{1}{2} \times 0.4 = 1.5,$$

thus $L_{a2}=1.5$ m. The exposed segment length of the anchor bolt is 0.3 m, and the total length of the anchor bolt is $L_a=L_{a1}+L_{a2}+L_{a3}=0.4+1.5+0.3=2.2$, thus $L_a=2.2$ m.

Finally, the total length of the anchor bolt is 2.2 m, where the anchoring segment length of the anchor bolt is 0.4 m, the free segment length of the anchor bolt is 1.5 m, and the exposed segment length of the anchor bolt is 0.3 m. The length of the anchor bolt used in a previous roadway is 2.4 m. A drawing test is performed for the anchor bolts in the designed roadway and the previous roadway of the coal mine, which shows that the ultimate breaking forces of the anchor bolts in the designed roadway and the previous roadway are 246 kN and 232 kN respectively and the strength of the anchor bolt in the designed roadway is improved compared with that in the previous roadway. Therefore, compared with the previously-designed method, the anchor bolt length determination method fully utilizing the horizontal extrusion force according to the present disclosure enables the length of the anchor bolt to be more reasonable and produces a better anchoring effect.

Of course, the above descriptions are not intended to limit the present disclosure, and the present disclosure is also not limited to the above examples. Changes, modifications, additions or substitutions made by persons skilled in the art within the spirit of the present disclosure shall also belong to the scope of protection of the present disclosure.

The invention claimed is:

1. An anchor bolt length determination method based on monitoring of a roof rock stratum horizontal extrusion force, comprising the following steps:
   at step (1), drilling a borehole in the middle of a roadway roof to determine a surrounding rock fracturing scope by a borehole television;
   at step (2), selecting the number and locations of horizontal extrusion force measuring points according to the surrounding rock fracturing scope;
   at step (3), monitoring and recording a change of the horizontal extrusion force of each horizontal extrusion force measuring point over time in the borehole;
   at step (4), selecting a location with the largest horizontal extrusion force as a center of an anchoring segment of an anchor bolt to determine a distance between the anchoring center and the roof; and
   at step (5), calculating a total length of the anchor bolt;
   wherein at step (3), the change of the horizontal extrusion force of each horizontal extrusion force measuring point over time in the borehole is monitored and recorded by a device for monitoring a roof rock stratum horizontal extrusion force comprising a pressure measuring segment, a connecting rod, a hydraulic pump, a pressure gauge, a high-pressure oil pipe, a pressure control valve, a tray, a push rod and a connection casing; the connecting rod is connected with the pressure measuring segment, a front end of the push rod is connected with the connecting rod, a rear end of the push rod passes through the tray, and the connection casing is connected with the tray; the high-pressure oil pipe is connected with the hydraulic pump and protrudes to the pressure measuring segment through inner cavities of the push rod and the connection casing; the pressure measuring segment comprises a main pipe, a hydraulic bladder, a fixing ring, a barrier sheet, an outer pillow housing and a connection sleeve; both ends of the hydraulic bladder are sleeved on the main pipe by the fixing rings, and an oil inlet is disposed on the main pipe to be in communication with the hydraulic bladder; the outer pillow housing is sleeved on the main pipe, the connection sleeve is wrapped around an outer side of the outer pillow housing, and the barrier sheet is disposed between the fixing ring and the outer pillow housing.

2. The anchor bolt length determination method based on monitoring of a roof rock stratum horizontal extrusion force according to claim 1, wherein at step (1), the borehole is 2-5 m in depth and 70-100 mm in diameter; at step (2), the horizontal extrusion force measuring points are disposed at a portion 1 m or more from the roof and mutually spaced less than 0.5 m.

3. The anchor bolt length determination method based on monitoring of a roof rock stratum horizontal extrusion force according to claim 1, wherein each of the high- pressure oil pipes is divided into a plurality of segments and the high-pressure oil pipes are mutually connected by an oil pipe joint, one segment is connected on the hydraulic pump, one segment is disposed in inner cavities of the push rod and the connecting rod, and another segment is disposed in the pressure measuring segment; the oil pipe joint is disposed in the connection casing; the pressure control valve and the pressure gauge are further disposed on the high-pressure oil pipe connected on the hydraulic pump; two or more pressure measuring segments are connected on the connecting rod, and one communicating high-pressure oil pipe is disposed for each pressure measuring segment; a design length margin of the high-pressure oil pipe is placed in the connection casing.

4. The anchor bolt length determination method based on monitoring of a roof rock stratum horizontal extrusion force according to claim 3, wherein monitoring and recording the change of the horizontal extrusion force over time in the borehole by the device for monitoring a roof rock stratum horizontal extrusion force comprises the following steps:

at step a, connecting the connecting rod with the pressure measuring segment, connecting the high-pressure oil pipes in the inner cavities of the connecting rod and the pressure measuring segment by the oil pipe joint, fixing the tray, and mounting the connection casing;

at step b, pushing the connecting rod and the pressure measuring segment into the borehole by the push rod, and after the tray and the roof are fixed, dismounting the connection casing and the push rod;

at step c, connecting the exposed high-pressure oil pipes, and connecting the hydraulic pump, the pressure control valve and the pressure gauge;

at step d, turning on a switch on the pressure control valve, performing pressurization by injecting oil using the hydraulic pump, and after the reading of the pressure gauge reaches 5-6 MPa, stopping pressurization and returning hydraulic oil; emptying air in the high-pressure oil pipe by repeating this step 2-5 times;

at step e, performing pressurization by injecting oil using the hydraulic pump, and after the reading of the pressure gauge reaches 5-6 MPa, closing the pressure control valve;

at step f, performing pressurization for a plurality of pressure measuring segments respectively by injecting hydraulic oil according to steps d and e;

at step g, dismounting the hydraulic pump, and monitoring and storing monitoring data of the pressure gauge; and at step h, opening the pressure control valve to discharge the hydraulic oil; connecting the connection casing with the push rod to take out the connecting rod and the pressure measuring segment from the borehole.

5. The anchor bolt length determination method based on monitoring of a roof rock stratum horizontal extrusion force according to claim 1, wherein the high-pressure oil pipe is connected with the oil inlet on the main pipe by an oil pipe joint, internal threads is disposed at inner sides of pipe walls at both ends of the main pipe respectively to be mated with an external thread of the connecting rod, and external threads is disposed at outer sides of pipe walls at both ends of the main pipe respectively to be mated with an internal thread of the barrier sheet; a through-hole is disposed in the tray, and the connecting rod passes through the through-hole of the tray; the connection casing is connected with an external thread at a convex position of the tray;

the push rod pushes the connecting rod and the pressure measuring segment by the connection casing.

6. The anchor bolt length determination method based on monitoring of a roof rock stratum horizontal extrusion force according to claim 1, wherein the outer pillow housing is divided into four parts of same shape, and the combination body of the outer pillow housing is a cylindrical housing; the outer pillow housing is sleeved on the main pipe when the hydraulic bladder contracts, and expands in four parts when the hydraulic bladder is liquid-filled to expand; both ends of the connection sleeve are closely attached to the main pipe, and the connection sleeve tightly presses both ends of the outer pillow housing to be in contact with the main pipe.

7. The anchor bolt length determination method based on monitoring of a roof rock stratum horizontal extrusion force according to claim 1, wherein at step (5), calculation of a length of the anchor bolt comprises calculation of an anchoring segment length $L_{a1}$ of the anchor bolt, a free segment length $L_{a2}$ of the anchor bolt and a total length $L_a$ of the anchor bolt, wherein the free segment length of the anchor bolt is $$L_{a2} = h - \frac{1}{2}L_{a1},$$

the distance between the anchoring center and the roof is h, and the anchoring segment length $L_{a1}$ of the anchor bolt is 0.3-0.5 m; the total length of the anchor bolt is $L_a = L_{a1} + L_{a2} + L_{a3}$, and an exposed segment length of the anchor bolt is $L_{a3}$ which is in the range of 0.2-0.3 m.

* * * * *